United States Patent [19]
Longo et al.

[11] Patent Number: 4,477,656
[45] Date of Patent: Oct. 16, 1984

[54] METHOD FOR REMOVING SODIUM SALTS FROM POLYPHOSPHAZENE POLYMER SOLUTIONS

[75] Inventors: Trent F. Longo, Mayfield Heights; Vispi R. Sagar, Canal Fulton; Mark L. Stayer, Suffield, all of Ohio

[73] Assignee: The Firestone Tire & Rubber Company, Akron, Ohio

[21] Appl. No.: 572,271

[22] Filed: Jan. 20, 1984

[51] Int. Cl.$^3$ .............................................. C08G 79/04
[52] U.S. Cl. ................................... 528/487; 528/482; 528/499; 528/502
[58] Field of Search ................. 528/482, 487, 499, 502

[56] References Cited

U.S. PATENT DOCUMENTS 2,999,891  9/1961  Gleason et al. ...................... 528/487
3,985,835  10/1976  Kao ...................................... 260/927
4,124,557  11/1978  Dieck et al. .......................... 528/487

FOREIGN PATENT DOCUMENTS 904109  8/1962  United Kingdom ................. 528/487

OTHER PUBLICATIONS

Article Entitled "Fluoralkyl Phosphonitrilates, A New Class of Potential Fire-Resistant Hydraulic Fluids and Lubricants", by Henry Lederle et al., vol. 11, No. 2, Journal of Chemical and Engineering Data, (Apr. 1966).

Primary Examiner—Lester L. Lee
Attorney, Agent, or Firm—Frank J. Troy, Sr.

[57] ABSTRACT

An improved method for removing sodium salts from mixtures of such salts and polyaryloxyphosphazene or polyalkoxyphosphazene or polyalkoxyaryloxyphosphazene polymer solutions is provided. The method involves first treating the mixture with an acid to neutralize any excess alkoxide or aryloxide. Then, water is added to the mixture to extract the sodium salts therefrom resulting in an at least partial separation of the mixture into a polyphosphazene polymer solution phase and a brine phase comprising water and the sodium salts. Following addition of the water to the mixture, a sulfated fatty acid ester of a natural non-petroleum based oil is added to the mixture to effect a more complete separation of the mixture into the polyphosphazene polymer solution phase and the brine phase. The polyphosphazene polymer solution phase is then separated from the brine phase.

8 Claims, No Drawings

METHOD FOR REMOVING SODIUM SALTS FROM POLYPHOSPHAZENE POLYMER SOLUTIONS

BACKGROUND OF THE INVENTION

The invention relates to a method of removing sodium salts from mixtures of polyphosphazene polymers and such salts. More particularly, the invention relates to an improved method of removing sodium salts from mixtures of polyphosphazene polymer solutions and such salts which features the use of a sulfated fatty acid ester of a natural nonpetroleum based oil as a surfactant in effecting a more complete separation of the mixture into distinct polyphosphazene polymer solution and brine phases thereby allowing for more complete removal of the sodium salts from the polymer solution.

The method of the invention is applicable to the removal of sodium salts from mixtures of said salts and solutions of polyphosphazene polymers represented by the formula:

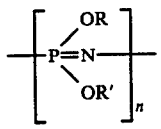

wherein R and R' may be the same or different and are selected from the group consisting of alkyl, substituted alkyl, aryl, and substituted aryl groups and n is from 20 to 50,000. The substituted or unsubstituted alkyl and aryl groups may be any of those heretofore known in the polyphosphazene art which may be incorporated into the polyphosphazene polymer by the so-called alkoxide or aryloxide derivatization reaction. Thus, such substituents may be any of those described in such U.S. Pat. Nos. as 3,370,020; 3,515,688; 3,700,629; 3,702,833; 3,856,712; 3,856,713; 3,853,794; 3,883,451; 3,970,533; and 4,225,697, the disclosures of which are incorporated herein by reference. Typical substituted alkyl groups which may be present in the polymers include fluorine substituted alkyl groups such as those described in the aforementioned incorporated patents. Typical substituted aryl groups which may be present in the polymers include alkyphenyls, halogen-substituted phenyls and alkoxy-substituted phenyls such as those described in the aforementioned patents.

Mixtures of sodium salts and solutions of polyphosphazene polymers of the above formula are generally prepared in well-known manner by reacting in solution polydichlorophosphazene polymers $-NPCl_2)_n$ in which n is from 20 to 50,000 with an alkoxide or aryloxide represented by the formula NaOR or NaOR' wherein R and R' are defined above.

Prior methods of removing sodium salts from such mixtures and recovering the polymer from solution generally involve a process in which the mixtures are first neutralized with an acid such as sulfuric acid or hydrochloride acid to neutralize any excess aryloxide or alkoxide. Then, water is added to the mixture to extract the sodium salts (e.g., sodium chloride, sodium sulfate or mixtures thereof) from the mixture to form two separate phases; an upper polyphosphazene polymer solution phase and a lower brine phase consisting of water and sodium salts. The brine phase is then separated from the polymer solution phase, usually by draining off the lower brine phase. The polyphosphazene polymer is then generally recovered from solution by pumping the remaining polymer solution through a coalescer, preconcentrating the polymer solution with an alkane (e.g., hexane), steam desolventising the polymer solution to remove organic solvents and then drying the polymer in a vacuum oven.

However, in such prior processes, a major problem often occurs in the water extraction process. Thus, the water extraction process often results in the formation of a partial or total emulsion. As a consequence, significant amounts of sodium salts are often entrapped in the polyphosphazene polymer solution and consequently in the dried polyphosphazene polymer. The presence of significant amounts of salt in the polyphosphazene polymer adversely affects the physical properties of the polymer. Thus, it is desirable to produce polymers having less than 1% salt and preferably 0.25% or less. Accordingly, when an emulsion forms during the water extraction step and excessive amounts of salt are entrapped in the polymer, it is necessary to subject the polymer to additional processing to remove the excess salt. This generally involves wash milling the polymer, a process in which the polymer is milled and washed with water for time periods of up to 30 minutes. In order to achieve the desired low levels of salt, it may be necessary to conduct multiple wash milling procedures. As will be evident, such procedures are both time consuming and labor intensive.

The prior art has alluded to the formation of emulsions during the water extraction process and suggested several proposed solutions to the problem. Thus, for example, U.S. Pat. No. 3,985,835 to Kao suggests that as a precaution against the formation of emulsions, the water should be maintained at a pH of 9 or higher. The reference further teaches that should an emulsion appear during the water extraction procedure, sodium chloride or other salt should be added. Additionally, the article entitled Fluoroalkyl Phosphonitrilates, A New Class of Potential Fire-Resistant Hydraulic Fluids and Lubricants, by Henry Lederle, et al., Volume 11, No. 2, Journal of Chemical & Engineering Data discloses the formation of an emulsion during water-washing and the use of sodium sulfate to break the emulsion. However, applicants have found that the use of sodium salts to prevent the formation of or to break emulsions formed during the water extraction process has been singularly ineffective.

In view of the foregoing, the provision of a simplified process for handling emulsions which form during the water extraction process and for promoting a more complete separation of the polymer solution phase from the brine phase would constitute a highly significant development.

SUMMARY OF THE INVENTION

In accordance with the invention, there is provided an improved method for removing sodium salts from a mixture of such salts and solutions of polyphosphazene polymers represented by the formula:

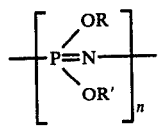

wherein said mixture has been formed by reacting a polydichlorophosphazene polymer represented by the formula $-\text{NPCl}_2)_n$ in which n is from 20 to 50,000 with an alkoxide or aryloxide represented by the formula NaOR or NaOR' wherein R, R', and n are as defined above.

The method comprises the steps of: (a) treating the mixture with an acid to neutralize any excess aryloxide or alkoxide; (b) adding water to the mixture to extract sodium salts therefrom resulting in an at least partial separation of the mixture into a polyphosphazene polymer solution phase and a brine phase comprising water and sodium salts; (c) adding from about 0.1 to about 1.0 parts by weight of a sulfated fatty acid ester of a natural non-petroleum based oil per 100 parts by weight of polyphosphazene polymer solution to the mixture to effect a more complete separation of the mixture into the polyphosphazene polymer solution phase and the brine phase; and (d) separating the polyphosphazene polymer solution phase from the brine phase.

In a preferred embodiment of the process of the invention, steps (b) and (c) are performed simultaneously.

DETAILED DESCRIPTION OF THE INVENTION

As indicated above, the mixture of sodium salts and solutions of polyphosphazene polymers of the above formula are formed by reacting in solution a polydichlorophosphazene polymer with an aryloxide or alkoxide.

This reaction is commonly referred to in the polyphosphazene art as derivatization or substitution. The reaction is preferably conducted by reacting a solution of the polydichlorophosphazene polymer in an alkane solvent such as cyclohexane or a mixture of alkane solvents such as a mixture of hexane and cyclohexane with a solution of the alkoxide or aryloxide in tetrahydrofuran (THF). It should also be noted than in this derivatization reaction, a 5 to 10% molar excess of the alkoxide or aryloxide is often employed in order to assure complete substitution of the chlorine atoms of the polydichlorophosphazene with the alkoxide or aryloxide.

As indicated above, the first step in the process for removing sodium salts from the mixture, i.e., step (a), involves treating the mixture with an acid to neutralize any excess aryloxide or alkoxide which may be present in the mixture. Various acids may be utilized including sulfuric acid, hydrochloric acid or even carbon dioxide and water. The preferred acid is sulfuric acid. This neutralization procedure results in the formation of small amounts of the free alcohol from which the alkoxide or aryloxide was derived. The neutralization also produces additional sodium salts such as sodium chloride, sodium sulfate, sodium carbonate, and the like, the nature of which is dependent upon the specific acid utilized.

The second step in the process, i.e., step (b), involves adding water to thhe mixture of sodium salts and polyphosphazene polymer solution in order to extract the sodium salts therefrom. The amount of water added to the mixture may in general be any amount which is sufficient to effect phase separation. The water is preferably added in amounts of from about 25 to 30 parts per 100 parts of polyphosphazene polymer solution. The addition of water to the mixture results in at least partial separation of the mixture into a polyphosphazene solution phase and a water-salt phase which is commonly referred to as a brine phase.

The third step in the process, i.e., step (c), involves adding to the mixture a sulfated fatty acid ester of a natural non-petroleum based oil. The addition of the sulfated fatty acid ester promotes a more complete separation of the mixture into the polyphosphazene polymer solution and brine phases. A preferred sulfated fatty acid ester which is employed for the purpose is one which is commercially available under the designation Dymsol PA from Diamond Shamrock and which is identified as a red-amber liquid containing 7.0% by weight of $SO_3$, 25% by weight of water, 1.3% by weight of alkali and having a pH of 7.8 (2% solution). The sulfated fatty acid ester may be added to the mixture in amounts of from about 0.1 to about 1.0 parts by weight, preferably 0.5 parts by weight per 100 parts by weight of polyphosphazene polymer solution.

As indicated above, in a preferred embodiment of the method of the invention, the addition of water and sulfated fatty acid ester to the mixture are conducted simultaneously. This can be accomplished by merely adding the water and sulfated fatty acid ester to the mixture at the same time. A preferred method is to first add the sulfated fatty acid ester to the water and then add the resultant water-sulfated fatty acid ester mixture to the mixture of sodium salts and polyphosphazene polymer solution.

In the two-phase mixture, the polyphosphazene polymer solution phase is the upper phase and the brine phase is the lower phase. It should be observed here that the polyphosphazene polymer solution phase in addition to polymer and organic solvents may contain small amounts of free alcohol and water while the brine phase in addition to sodium salts and water may contain small amounts of organic solvent and free alcohol.

The fourth step in the process, i.e., step (d), involves the separation of the polyphosphazene polymer solution phase from the brine phase. This may be accomplished by any convenient method. A preferred method is to simply drain off the lower brine phase.

A significant advantage to the process of the invention and in particular the use of the sulfated fatty acid ester to promote complete phase separation is that it is possible to simplify the recovery of the polyphosphazene polymer from the solution. Thus, in view of the more complete phase separation which leads to the production of more uniformly low salt levels in the polymer, both the stream desolventization and wash milling procedures can be eliminated. This permits one to proceed directly from the preconcentration procedure to a more efficient and rapid polymer drying procedure, such as, for example, the use of extruder dryers.

The following example is submitted for the purpose of further illustrating the nature of the present invention and is not to be regarded as a limitation on the scope thereof. Parts and percentages shown in the example are by weight unless otherwise indicated.

EXAMPLE 1

To a mixture of sodium salts and 1500.1 grams of a solution of commercial poly(fluoroalkoxy) phosphazene polymer available under the designation PNF® from the Firestone Tire & Rubber Company in which the excess fluoroalkoxide had previously been neutralized with sulfuric acid was added 450.0 grams of water. Upon addition of the water to the mixture, an emulsion formed. To this emulsion was added 7.50 grams of a sulfated fatty acid ester designated Dymsol PA available from Diamond Shamrock (defined above). Upon mixing and standing for a short period of time, the emulsion separated into two distinctly separate phases, a poly(fluoroalkoxy) phosphazene solution upper phase and a lower brine phase comprising water and sodium salts. The poly(fluoroalkoxy) phosphazene solution phase was then separated from the brine phase by draining off the brine phase. The polymer was precipitated from solution with hexane and vacuum dried @ 65° C. A control polymer was prepared under identical conditions with the exception that Dymsol PA was omitted. The resultant polymers were analyzed for salt content with the following results:

| Example No. Conditions | Control (No Dymsol PA) | 1 Extracted Using Dymsol PA |
|---|---|---|
| % NaCl | 1.68 | 0.133 |

We claim:

1. A method for removing sodium salts from a mixture of sodium salts and a solution of a polyphosphazene polymer represented by the formula:

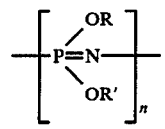

wherein R and R' may be same or different and are selected from the group consisting of alkyl, substituted alkyl, aryl and sustituted aryl groups and n is from 20 to 50,000, said mixture having been formed by reacting in solution a polydichlorophosphazene polymer represented by the formula $-\mathrm{NPCl_2)}_n$ wherein n is from 20 to 50,000 with an aldoxide or aryloxide represented by the formula NaOR or NaOR' wherein R and R' are defined above; said method comprising the steps of:

(a) treating said mixture with an acid to neutralize any excess alkoxide or aryloxide;

(b) adding water to the mixture to extract sodium salts therefrom resulting in an at least partial separation of the mixture into a polyphosphazene polymer solution phase and a brine phase comprising water and sodium salts.

(c) adding from about 0.1 to about 1.0 parts by weight of a sulfated fatty acid ester of a natural nonpetroleum based oil per 100 parts by weight of polyphosphazen polymer solution to the mixture to effect a more complete separation of the polyphosphazene polymer solution phase from the brine phase; and (d) separating the polyphosphazene polymer solution phase from the brine phase.

2. The method of claim 1 wherein the water and sulfated fatty acid ester are added simultaneously to the mixture.

3. The method of claim 2 wherein said simultaneous addition is conducted by first adding the sulfated fatty acid ester to the water and then adding the water containing the sulfated fatty acid ester to the mixture.

4. The method of claim 1 wherein said polyphosphazene polymer is a poly(fluoroalkoxy) phosphazene polymer.

5. The method of claim 1 wherein said acid is sulfuric acid.

6. The method of claim 1 wherein said water is added to the mixture in an amount of from about 25 to about 30 parts by weight per 100 parts by weight of polyphosphazene polymer solution.

7. The method of claim 1 wherein said sulfated fatty acid ester is added to the mixture in an amount of 0.5 parts by weight per 100 parts by weight of polyphosphazene polymer solution.

8. The method of claim 1 wherein said sulfated fatty acid ester is a red-amber liquid containing 7.0% by weight of $SO_3$, 25% by weight of water, 1.3% by weight of alkali and having a pH of 7.8 in a 2% solution.

* * * * *